US010795299B2

(12) United States Patent
Itagaki

(10) Patent No.: US 10,795,299 B2
(45) Date of Patent: Oct. 6, 2020

(54) IMAGE FORMING APPARATUS GENERATING IMAGE FORMING CONDITION BASED ON DETECTED IMAGES

(71) Applicant: CANON KABUSHIKI KAISHA, Tokyo (JP)

(72) Inventor: Tomohisa Itagaki, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/597,425

(22) Filed: Oct. 9, 2019

(65) Prior Publication Data

US 2020/0117130 A1 Apr. 16, 2020

(30) Foreign Application Priority Data

Oct. 15, 2018 (JP) .................................. 2018-194217

(51) Int. Cl.
*G03G 15/00* (2006.01)

(52) U.S. Cl.
CPC .................... *G03G 15/50* (2013.01)

(58) Field of Classification Search
CPC . G03G 15/50; G03G 15/5041; G03G 15/5062
USPC .............................................. 399/15, 49, 74
See application file for complete search history.

(56) References Cited

U.S. PATENT DOCUMENTS

| 6,697,167 | B1 | 2/2004 | Takahashi | |
|---|---|---|---|---|
| 6,959,157 | B2 | 10/2005 | Nakayama | |
| 7,130,082 | B2 | 10/2006 | Takahashi | |
| 7,230,739 | B2 | 6/2007 | Takahashi | |
| 7,509,065 | B2 | 3/2009 | Itagaki | |
| 9,973,660 | B2 * | 5/2018 | Itagaki | G03G 15/5062 |
| 10,212,314 | B2 * | 2/2019 | Takemura | G03G 15/5062 |
| 10,484,555 | B2 * | 11/2019 | Itagaki | G03G 15/5062 |

FOREIGN PATENT DOCUMENTS

| JP | 11-75067 A | 3/1999 |
|---|---|---|
| JP | 2009-053346 A | 3/2009 |

* cited by examiner

*Primary Examiner* — William J Royer
(74) *Attorney, Agent, or Firm* — Venable LLP

(57) ABSTRACT

An image forming apparatus forms an image on a sheet and conveys the sheet through a conveying path. The image forming apparatus includes a color detection sensor which detects a detection image formed on the sheet for generating an image forming condition and a white reference plate used to calibrate the color detection sensor. The white reference plate is arranged opposite to the color detection sensor with the conveying path interposed therebetween at a position where the white reference plate is not concealed by the sheet when viewed from the color detection sensor when the sheet is conveyed to the conveying path. The detection image is formed on a white reference plate side of the sheet. The color detection sensor reads the white reference plate and is calibrated according to a read result.

9 Claims, 8 Drawing Sheets

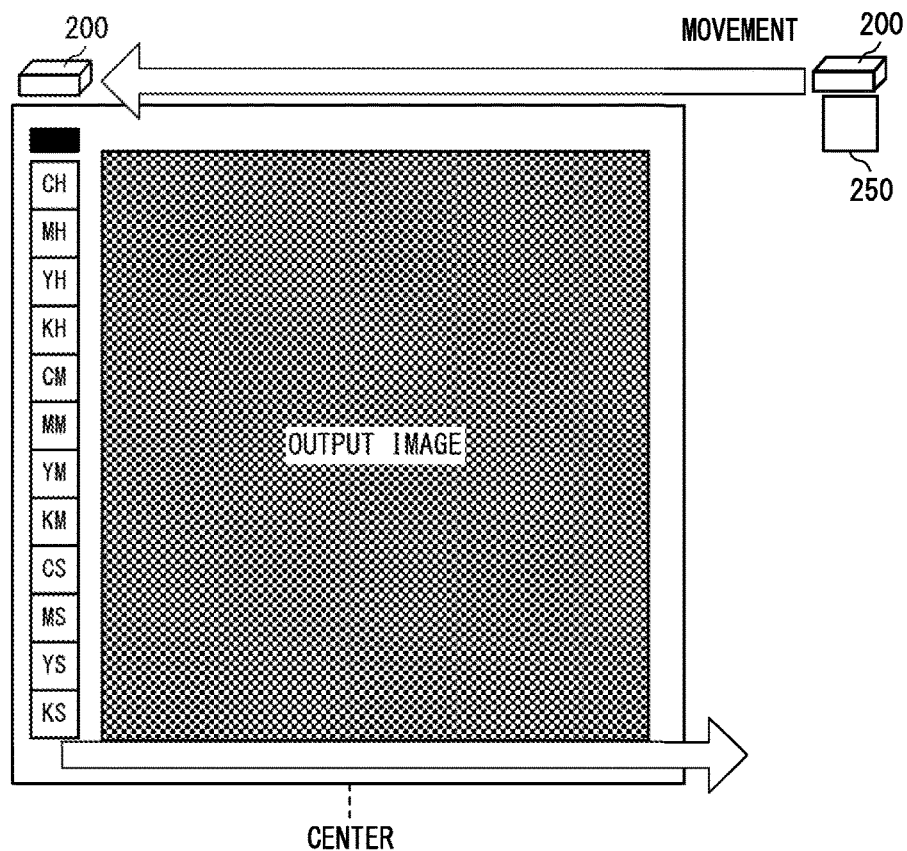
FIG. 8B
CONVENTIONAL

IMAGE FORMING APPARATUS GENERATING IMAGE FORMING CONDITION BASED ON DETECTED IMAGES

BACKGROUND OF THE INVENTION

Field of the Invention

The present disclosure relates to a technology for stabilizing image quality of an image forming apparatus.

Description of the Related Art

On-demand image forming apparatuses (hereinafter referred to as "printers") have achieved remarkable improvement in image quality, productivity and reduction in costs, and are entering an offset printing market. However, as an image quality level of the offset printing is high, the printer is limitedly used in the offset printing market. To further expand market for the printer, image quality which is equal to or better than that of the offset printing is required. Of particular importance is a total evaluation value including stability of image quality, improvability, a color reproduction range and the like, i.e, improvement in color reproducibility.

To improve color reproducibility, various proposals are made. Japanese Patent Application Laid-Open No. Hei 11-75067 describes a technology for correcting image density by detecting the image density of an image formed on a sheet by a reader of a copying machine and correcting an image forming condition according to a detection result. U.S. Pat. No. 7,509,065 B2 and U.S. Pat. No. 6,959,157 B2, each comprising an in-line type sensor for detecting the image density of the image formed on the sheet being conveyed, propose technology for correcting the image density by correcting the image forming condition according to a detection result of the sensor. In the image forming apparatus of the U.S. Pat. No. 7,509,065 B2, an RGB sensor is incorporated as the in-line type sensor. In the image forming apparatus of the U.S. Pat. No. 6,959,157 B2, a spectral reflectance sensor with higher reading range and accuracy than the RGB sensor is incorporated as the in-line type sensor. For example, a sensor detects the image density by irradiating the sheet with light and receiving the reflected light. Therefore, if the sheet being conveyed flaps, the sensor cannot detect the image density with high accuracy. Japanese Patent Application Laid-Open No. 2009-53346 proposes an image forming apparatus for correcting the image density, in which a configuration for moving the sensor in a direction orthogonal to a conveying direction of the sheet is provided and the image density is corrected by correcting the image forming condition by detecting the image density of the image formed on the sheet.

To accurately detect the image density, the sensor needs to be calibrated. When the sensor moves in the direction orthogonal to the conveying direction of the sheet, to perform the calibration, the sensor needs to return to a reading position of a reference plate used for the calibration. Due to this, when detecting a plurality of images, a total detection time of the image density including calibration time becomes long. Further, when continuously performing image formation, if a colorimetric analysis of the image on the sheet is highly frequently performed, the detection accuracy of the image density is deteriorated. This is because the sheet heated by a fixing device for fixing the image radiates heat so that light emission characteristics and light receiving characteristics of the sensor change. It is an object of the present disclosure to provide an image forming apparatus capable of suppressing time spent, by the sensor, to detect a detection image formed on the sheet.

SUMMARY OF THE INVENTION

An image forming apparatus according to the present disclosure includes an image forming unit configured to form an image on a sheet based on an image forming condition; a conveying unit configured to convey the sheet; a sensor configured to move in a direction orthogonal to a conveying direction in which the conveying unit conveys the sheet, and detect a detection image on the sheet; a reference member provided at a position different from a passage area of the sheet in the direction orthogonal to the conveying direction; and a controller configured to: control the image forming unit to form first detection images outside of an image area on the sheet, wherein the image forming unit forms an output image on the image area; control the image forming unit to form second detection images on the sheet without forming the output image; perform a first mode in which the sensor detects the first detection images and the reference member; perform a second mode in which the sensor detects the second detection images and the reference member; calibrate the sensor based on a detection result of the reference member; generate the image forming condition based on a detection result of the first detection images; and generate the image forming condition based on a detection result of the second detection images, wherein the number of times that the sensor detects the reference member in the first mode is larger than the number of times that the sensor detects the reference member in the second mode, wherein the first detection images include at least twelve detection images arranged along the conveying direction, and wherein the second detection images include at least twelve detection images arranged along the conveying direction.

Further features of the present invention will become apparent from the following description of exemplary embodiments (with reference to the attached drawings).

BRIEF DESCRIPTION OF THE DRAWINGS

FIG. 8A and FIG. 8B are diagrams each explaining stabilization control.

DESCRIPTION OF THE EMBODIMENTS

Figure 1:
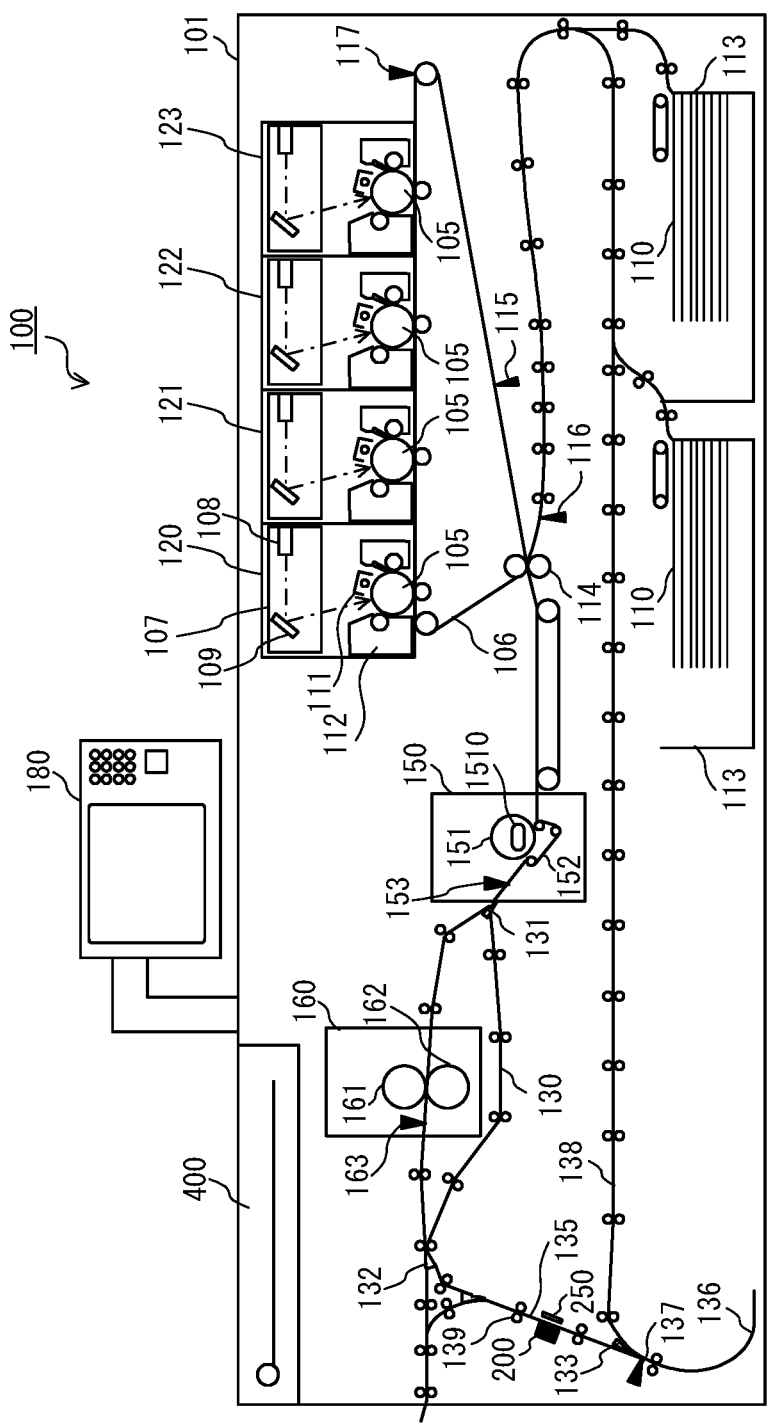
FIG. 1 is a configuration diagram of a laser beam printer.

In the following, embodiments of the present disclosure will be described in detail with reference to the drawings.
Image Forming Apparatus FIG. 1 is a configuration diagram of a laser beam printer (LBP) 100 as an image forming apparatus of the present embodiment. The LBP 100 performs image formation by an electrophotographic system. It should be noted that the image forming apparatus according to the present embodiment may be an inkjet printer or a sublimation type printer. In the present embodiment, an image obtained by performing only halftoning on a photographic attribute for print output, which is the most important attribute for the user, is formed on a plurality of sheets, an average value of the image density is calculated, and advanced gradation correction is performed using the calculated average value.

The LBP 100 comprises each mechanism constituting an engine part for image formation and a controller (described later) for controlling operations of each mechanism in a housing 101. An operation panel 180 and a reader 400 are provided on an upper part of the housing 101. The operation panel 180 is a user interface and includes an input device which receives instructions from a user and an output device which displays a screen such as an operation screen and the like. The reader 400 is an image reading device which is used when performing a copy job and a printer engine adjusting function. Each mechanism constituting the engine part comprises a mechanism for forming an image (image forming mechanism), a mechanism for transferring the image to a sheet 110 (transfer mechanism), a mechanism for feeding the sheet 110 (feeding mechanism), and a mechanism for fixing an image on the sheet 110 (fixing mechanism).

The image forming mechanism comprises four image forming units 120, 121, 122 and 123 which respectively correspond to each color of yellow (Y) magenta (M), cyan (C) and black (K). The image forming units 120, 121, 122 and 123 have the same configuration except that the colors of the images to be formed are different. The configuration of the image forming unit 120 will be described and the description of the configurations of the other image forming units 121, 122 and 123 will be omitted.

The image forming unit 120 includes a photosensitive drum 105, a charger 111, a laser scanner 107, and a developing device 112. The photosensitive drum 105 is a drum-shaped photoreceptor. The charger 111 uniformly charges a surface of the rotating photosensitive drum 105. The laser scanner 107 scans the photosensitive drum 105 by a laser beam modulated based on image data representing the image to be formed. The laser scanner 107 includes a light emitting part 108 which scans the laser beam emitted from a semiconductor laser in one direction, and a reflection mirror 109 which reflects the laser beam from the light emitting part 108 toward the photosensitive drum 105. It should be noted that a direction in which the laser scanner 107 scans the photosensitive drum 105 (depth direction in the drawing) is a main scanning direction.

After the surface of the photosensitive drum 105 is charged, the surface of the photosensitive drum 105 is scanned by the laser beam. Then, an electrostatic latent image is formed on the surface of the photosensitive drum 105. The developing device 112 develops the electrostatic latent image formed on the photosensitive drum 105 with developer. As a result, an image, in which the electrostatic latent image is developed, is formed on the surface of the photosensitive drum 105. A yellow image is formed on the photosensitive drum 105 of the image forming unit 120. A magenta image is formed on the photosensitive drum 105 of the image forming unit 121. A cyan image is formed on the photosensitive drum 105 of the image forming unit 122. A black image is formed on the photosensitive drum 105 of the image forming unit 123. It should be noted that the photosensitive drum 105 and the developing device 112 are attachable to and detachable from the housing 101.

The transfer mechanism comprises an intermediate transfer body 106 and a transfer roller 114. The image is sequentially superimposed on and transferred to the intermediate transfer body 106 from the respective photosensitive drums 105 of the image forming units 120, 121, 122 and 123. In the present embodiment, the intermediate transfer body 106 is rotated clockwise in the drawing and the image is transferred in order of the image forming unit 120 (yellow), the image forming unit 121 (magenta), the image forming unit 122 (cyan), and the image forming unit 123 (black). An image density detection sensor 117 is provided on a downstream side of the image forming unit 123 in a rotating direction of the intermediate transfer body 106. The image density detection sensor 117 is configured to detect image density from an image for detecting the image density which is formed on the intermediate transfer body 106.

The image transferred to the intermediate transfer body 106 is conveyed to the transfer roller 114 by the rotation of the intermediate transfer body 106. An image forming start position detection sensor 115 for determining a transfer position to the sheet 110 is provided on an upstream side of the transfer roller 114 in the rotating direction of the intermediate transfer body 106. The transfer roller 114 transfers the image from the intermediate transfer body 106 to the sheet 110 by bringing the sheet 110 into pressure contact with the intermediate transfer body 106 and at the same time, by being applied a bias having inverse characteristic to image on the intermediate transfer body 106.

The feeding mechanism includes a paper feeding cassette 113 for storing the sheet 110, a conveying path through which the sheet 110 is conveyed, and various rollers for conveying the sheet 110 to the conveying path. The sheet 110 is fed from the paper feeding cassette 113. The image is transferred to and fixed on the sheet 110 while the sheet 110 is being conveyed through the conveying path. Then, the image is formed. Thereafter, the sheet 110 is discharged outside the housing 101.

To this end, the sheet 110 is first fed from the paper feeding cassette 113 and conveyed to the transfer roller 114 through the conveying path. A paper feeding timing sensor 116 for adjusting timing to convey the sheet 110 is provided in the middle of the conveying path from the paper feeding cassette 113 to the transfer roller 114. Timing when the sheet 110 is conveyed to the transfer roller 114 is adjusted by timing when the image forming start position detection sensor 115 detects the image on the intermediate transfer body 106 and timing when the paper feeding timing sensor 116 detects the sheet 110. As a result, the image is transferred from the intermediate transfer body 106 to a predetermined position of the sheet 110.

The sheet 110 to which the image is transferred is conveyed to the fixing mechanism. The fixing mechanism of the LBP 100 of the present embodiment includes a first fixing device 150 and a second fixing device 160. The first fixing device 150 includes a fixing roller 151, a pressure belt 152 and a post-fixing sensor 153 for thermally compressing the image on the sheet 110. The fixing roller 151 is configured to heat the sheet 110. The pressure belt 152 is configured to bring the sheet 110 into pressure contact with the fixing roller 151. The post-fixing sensor 153 is configured to detect completion of the fixing. The fixing roller 151 is a hollow roller having a heater 1510 inside thereof, and is configured to convey the sheet 110 by rotation driving. The second fixing device 160 is disposed on a downstream side of the first fixing device 150 in a conveying direction of the sheet 110. The second fixing device 160 is used to add gross gloss to the image on the sheet 110 to which the fixing processing is applied by the first fixing device 150, and to secure fixing property. The second fixing device 160 includes a fixing roller 161, a pressure roller 162, and a post-fixing sensor 163. The fixing roller 161 has the same configuration as the fixing roller 151 and functions similarly to the fixing roller 151. The pressure roller 162 functions similarly to the pressure belt 152. The post-fixing sensor 163 functions similarly to the post-fixing sensor 153. Similar to the first fixing device 150, the second fixing device 160 performs the fixing processing on the sheet 110.

The second fixing device 160 may not be used depending on a type of the sheet 110 and contents of the image forming processing. A conveying path 130 is a path for discharging the sheet 110 to which the fixing processing is applied by the first fixing device 150 without passing through the second fixing device 160. A flapper 131 for guiding the sheet 110 to either the second fixing device 160 or the conveying path 130 is provided on the downstream side of the first fixing device 150 in the conveying path of the sheet 110.

The sheet 110 which passes through either of the second fixing device 160 or the conveying path 130 may be discharged as it is, or may be conveyed to a conveying path 135. To this end, a flapper 132 is provided after the conveying path after the second fixing device 160 and the conveying path 130 are merged. The flapper 132 guides the sheet 110 to either the conveying path 135 or a discharge path. The sheet 110 guided to the discharge path is discharged outside the housing 101 facing an image-formed side upward.

The conveying path 135 is a path for conveying the sheet 110 to a reversal path 136 which is used to reverse front and rear surfaces of the sheet 110. A reversal sensor 137 for detecting the sheet 110 is provided in the reversal path 136. When the reversal sensor 137 detects a rear end of the sheet 110, the conveying direction of the sheet 110 is switched in a reverse direction in the reversal path 136. The reversed sheet 110 is conveyed to either the conveying path 135 or a reversal path 138. To this end, a flapper 133 is provided at a branch between the conveying path 135 and the reversal path 138. When the sheet 110 is conveyed to the conveying path 135, the sheet 110 is guided to the conveying path 135 by the flapper 133, the front and rear surfaces are reversed (facing the image-formed side downward), and the sheet 110 is discharged outside the housing 101. When the sheet 110 is conveyed to the reversal path 138, the sheet 110 is guided to the reversal path 138 by the flapper 133. The sheet 110 which is guided to the reversal path 138 is again conveyed to the transfer roller 114. At this time, the front and rear surfaces of the sheet 110 are reversed. Thus, the image is formed on the rear surface of the sheet 110.

A color detection sensor 200 for detecting the detection image formed on the sheet 110 for detecting image density is provided in the conveying path 135. The color detection sensor 200 is a spectral sensor which is movable in the conveying direction of the sheet 110 and in a direction orthogonal to the conveying direction of the sheet 110. A white reference plate 250 (reference member) used to calibrate the color detection sensor 200 is provided at a position opposite to the color detection sensor 200 interposing the conveying path 135 therebetween.

When the user instructs color detection operation through the operation panel 180, the color detection sensor 200 detects the detection image formed on the sheet 110. Based on a detection result of the color detection sensor 200, the controller performs density unevenness correction to match uniformity of the image density, automatic gradation correction to maintain maximum density and gradation property of a single color, and automatic color tone correction to adjust variation in multi-order color. The controller also performs stabilization control of the image quality. In the stabilization control, it is possible to set whether to use the color detection sensor 200 or not to adjust the stability of the image which is consecutively output by detecting the detection image formed on the sheet 110.

Controller

Figure 2:
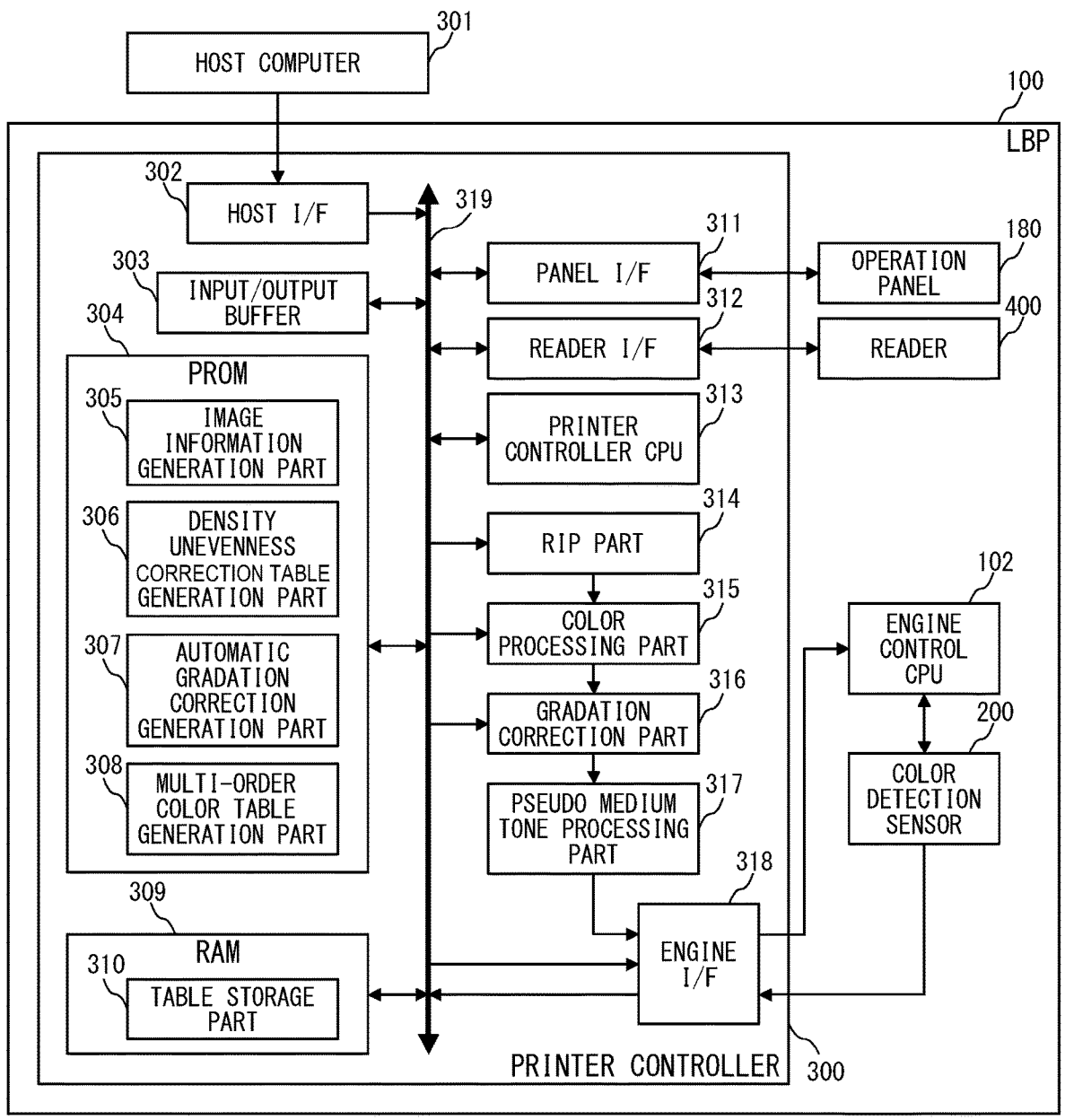
FIG. 2 is an explanatory view of a controller.

FIG. 2 is an explanatory view of a controller of the LBP 100. The LBP 100 can communicate with a host computer 301 as an external device by a predetermined communication protocol. The controller includes a printer controller 300 and an engine control central processing unit (CPU) 102. The printer controller 300 controls entire operation of the LBP 100. The engine control CPU 102 controls operation of each mechanism constituting the engine part for image formation in response to an instruction from the printer controller 300.

The printer controller 300 includes a host I/F 302, a panel I/F 311, a reader I/F 312, an engine I/F 318, and an input/output buffer 303. The host I/F 302 is a communication interface with the host computer 301. The panel I/F 311 is an interface with the operation panel 180 and receives an instruction from the operation panel 180 and causes the operation panel 180 to display on a screen. The reader I/F 312 is an interface with the reader 400 and obtains read data representing the image read by the reader 400. The engine I/F 318 transmits image data representing the image to be formed to the engine control CPU 102. The engine I/F 318 obtains the detection result of the color detection sensor 200. The input/output buffer 303 temporarily stores control codes obtained by the host I/F 302 and various data transferred and received by the panel I/F 311, the reader I/F 312, and the engine I/F 318.

The printer controller 300 includes a printer controller CPU 313, a program read only memory (PROM) 304 and a random access memory (RAM) 309. The printer controller CPU 313 controls the operation of the printer controller 300. The PROM 304 stores a control program performed by the printer controller CPU 313 and control data. The printer controller CPU 313 realizes various functions of the printer controller 300 by performing the control program stored in the PROM 304. The RAM 309 is used as a work memory for performing computation required for interpretation of control codes and data, and required for printing, or for processing print data.

The PROM 304 stores an image information generation part 305, a density unevenness correction table generation part 306, an automatic gradation correction generation part 307 and a multi-order color table generation part 308 as program modules. The printer controller CPU 313 realizes the respective functions by performing these program modules. The image information generation part 305 generates various image objects based on setting of data received from the host computer 301. The density unevenness correction table generation part 306 generates a density unevenness correction table representing relation between the density unevenness and a correction value to suppress the density unevenness in the main scanning direction by adjusting the laser emission intensity. The automatic gradation correction generation part 307 generates one-dimensional lookup table ($\gamma$LUT) for performing a density gradation correction of a single color. The multi-order color table generation part 308 generates an ICC profile as a multi-dimensional lookup table (LUT) to correct variation in multi-order color. A table storage part 310 is formed in the RAM 309. The table storage part 310 stores the density unevenness correction table, the γLUT, and the multi-dimensional LUT (ICC profile).

The printer controller 300 includes a raster image processor (RIP) part 314, a color processing part 315, a gradation correction part 316, and a pseudo medium tone processing part 317. The RIP part 314 develops an image object into a bitmap image. The color processing part 315 performs color conversion processing of multi-order color by the ICC profile. The gradation correction part 316 performs the gradation correction of single color by the γLUT. The pseudo medium tone processing part 317 performs pseudo medium tone processing such as a dither matrix and an error diffusion method.

Each part of the printer controllers controller 300 is connected to each other via a system bus 319 to allow mutual transmission and reception of data. When the printer controller 300 obtains the image data from the host computer 301 via the host I/F 302, the printer controller 300 performs processing of the obtained image data by the RIP part 314, the color processing part 315, the gradation correction part 316, and the pseudo medium tone processing part 317. The printer controller 300 transmits the processed image data to the engine control CPU 102 via the engine I/F 318. At this time, the printer controller 300 transmits laser light amount information corresponding to the density unevenness correction table to the engine control CPU 102 via the engine I/F 318. The engine control CPU 102 forms an image corresponding to the image data on the sheet 110 by controlling the operation of each mechanism based on the image data and the laser light amount information. The color processing part 315 and the gradation correction part 316 realize an output of desired color by managing and updating the ICC profile, the γLUT and the density unevenness correction table used during the image formation.

Operation Panel

Figure 3:
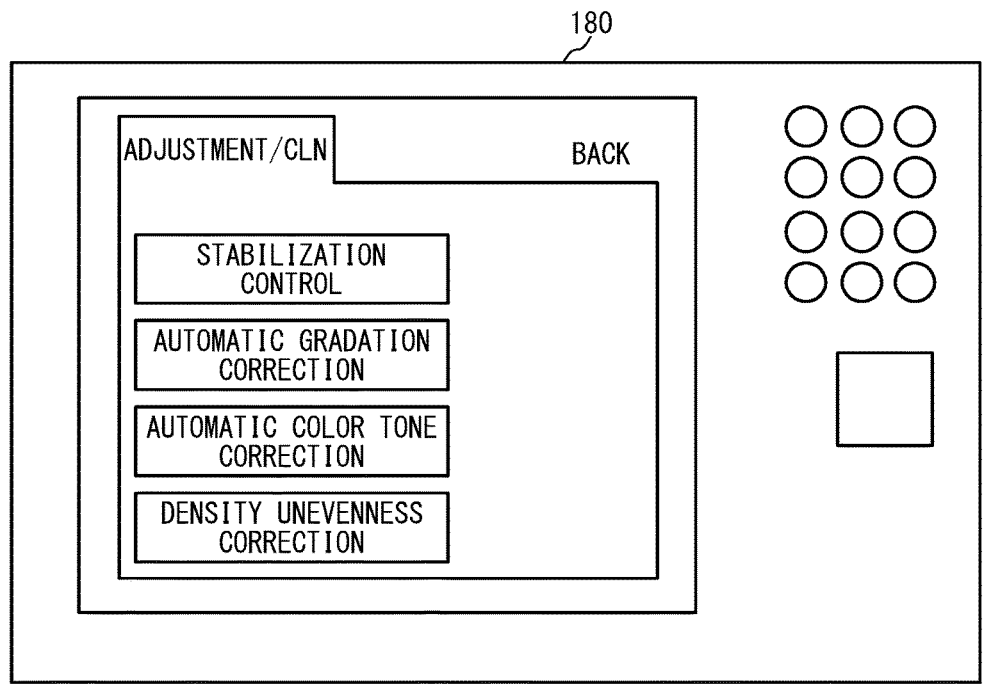
FIG. 3 is an explanatory view of an operation panel.

FIG. 3 is an explanatory view of the operation panel 180. FIG. 3 illustrates a screen displayed on the operation panel 180 when the user selects a user mode of "Adjustment/CLN" (CLN: Cleaning). In the adjustment mode, adjustment is performed by forming the detection image on the sheet 110. In the adjustment mode, stabilization control, automatic gradation correction, automatic color tone correction and density unevenness correction can be selected. The adjustment mode is an operation mode for optimizing various image forming conditions. The user selects one of a "stabilization control" button, an "automatic gradation correction" button, an "automatic color tone correction" button and a "density unevenness correction" button to cause the LBP 100 to perform the adjustment.

The "stabilization control" button is a button for setting whether to perform the stabilization control or not by forming the detection image on the sheet 110 during consecutive image formation. The "automatic gradation correction" button, the "automatic color tone correction" button, and the "density unevenness correction" button are buttons for the user to select a correctable sheet feeding cassette to correct the image forming condition during non-image formation. The automatic gradation correction matches the gradation of a single color. The automatic color tone correction corrects misregistration of multi-order which cannot be matched by the automatic gradation correction (single color). The density unevenness correction corrects an exposure condition of the laser scanner 107 to correct the density unevenness in the main scanning direction.

Color Detection Sensor

Figure 4:
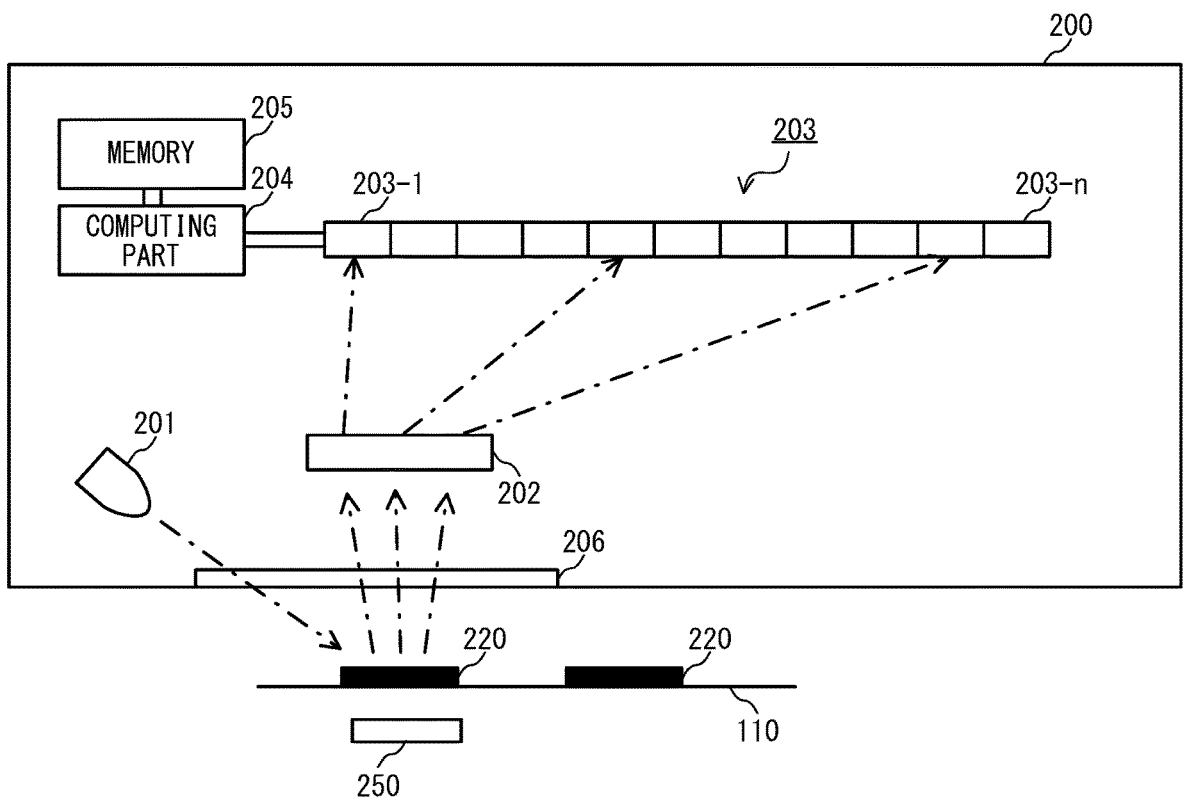
FIG. 4 is an explanatory view of a color detection sensor.

FIG. 4 is an explanatory view of the color detection sensor 200. The color detection sensor 200 performs the colorimetric analysis by detecting the spectral reflectance of a detection image 220 formed on the sheet 110. The color detection sensor 200 includes a white light emitting diode (LED) 201, a diffraction grating 202, a line sensor 203, a computing part 204, a memory 205, and a lens 206.

The white LED 201 is a light emitting part and irradiates the detection image 220 formed on the sheet 110 conveyed through the conveying path 135 with light. The diffraction grating 202 spectrally disperses reflected light from the detection image 220. The lens 206 condenses the light irradiated from the white LED 201 in the detection image 220 and condenses the reflected light from the detection image 220 in the diffraction grating 202.

The line sensor 203 is a light receiving part having light receiving elements 203-1 to 203-$n$ of n pixels. The respective light receiving elements 203-1 to 203-$n$ of the line sensor 203 receive the reflected light dispersed for each wavelength by the diffraction grating 202. The respective light receiving elements 203-1 to 203-$n$ output, as the detection result, for example, an optical intensity value indicating intensity of the received reflected light. The computing part 204 performs a predetermined computation to the light intensity value output from the respective light receiving elements 203-1 to 203-$n$. For example, the computing part 204 computes spectroscopy and a Lab value. The memory 205 stores various data such as computation results.

The white reference plate 250 is arranged opposite to the color detection sensor 200 interposing the conveying path 135 therebetween at a position where the white reference plate 250 is not concealed by the sheet 110 when viewing from the color detection sensor 200 when the sheet 110 is conveyed to the conveying path 135. The white reference plate 250 is used to calibrate the color detection sensor 200 including light amount adjustment of the white LED 201, white intensity standard correction and the like. To suppress deterioration with lapse of time and for attaching and detaching operation resistance properties, the white reference plate 250 is made of a material with high light resistance and high strength. For example, a material obtained by ceramic processing an aluminum oxide is used for the white reference plate 250. When the white reference plate 250 is shipped from a factory, the spectral reflectance (standard spectral reflectance data) of each wavelength is measured by a reference measuring instrument. The color detection sensor 200 is shipped with the white reference plate 250 with the measured standard spectral reflectance data attached thereto. One white reference plate 250 is provided for one color detection sensor 200.

As described above, the color detection sensor 200 is movable in the conveying direction and in the direction orthogonal to the conveying direction of the sheet 110 on the conveying path 135. The color detection sensor 200 and the white reference plate 250 form one set.

The color detection sensor 200 converts the light intensity value into spectral reflectance information based on standard spectral reflectance data by the computing part 204. In the present embodiment, the spectral reflectance information is detected as information about 35 bands (channels) at intervals of 10 nm in a wavelength ranging from 380 nm to 720 nm. The color detection sensor 200 transmits the spectral reflectance information to the printer controller 300 as the detection result.

The printer controller 300 performs processing such as the density unevenness correction, the stabilization control, the automatic gradation correction, the automatic color tone correction and the like based on the spectral reflectance information. The printer controller 300 performs the density unevenness correction, the stabilization control, and the automatic gradation correction based on a density value calculated from the spectral reflectance information using a status A filter and a visual filter.

By the density unevenness correction, the printer controller 300 recognizes the unevenness in the main scanning direction based on the density value and prepares a density unevenness correction table for correcting output (power) of the laser beam when scanning the photosensitive drum 105 so as to suppress the density unevenness in the main scanning direction. By the stabilization control, the printer controller 300 corrects a maximum density condition and the γLUT so as to correct the variation of the image density from a state immediately after the automatic gradation correction. The printer controller 300 maintains a state matched by the automatic gradation correction by the stabilization control. In the stabilization control, detailed gradation correction is performed by the automatic gradation correction. By the automatic color tone correction, the printer controller 300 converts the spectral reflectance information to CIE L*a*b* using a standard light source D50 and an isochromatic function as a conversion method of ISO 13655 and uses it for the automatic color tone correction. The automatic color tone correction means preparing the ICC profile as the multi-dimensional LUT.

Density Unevenness Correction

Figure 5A:
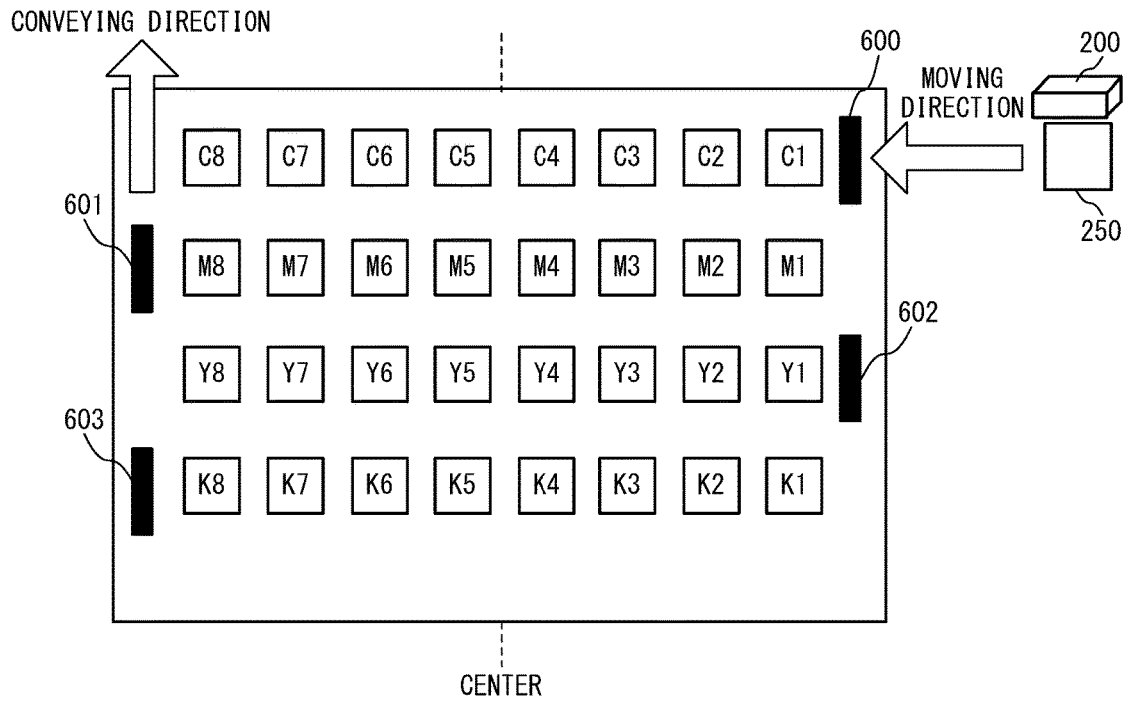
FIG. 5A and FIG. 5B are diagrams each explaining density unevenness correction.
Figure 5B:
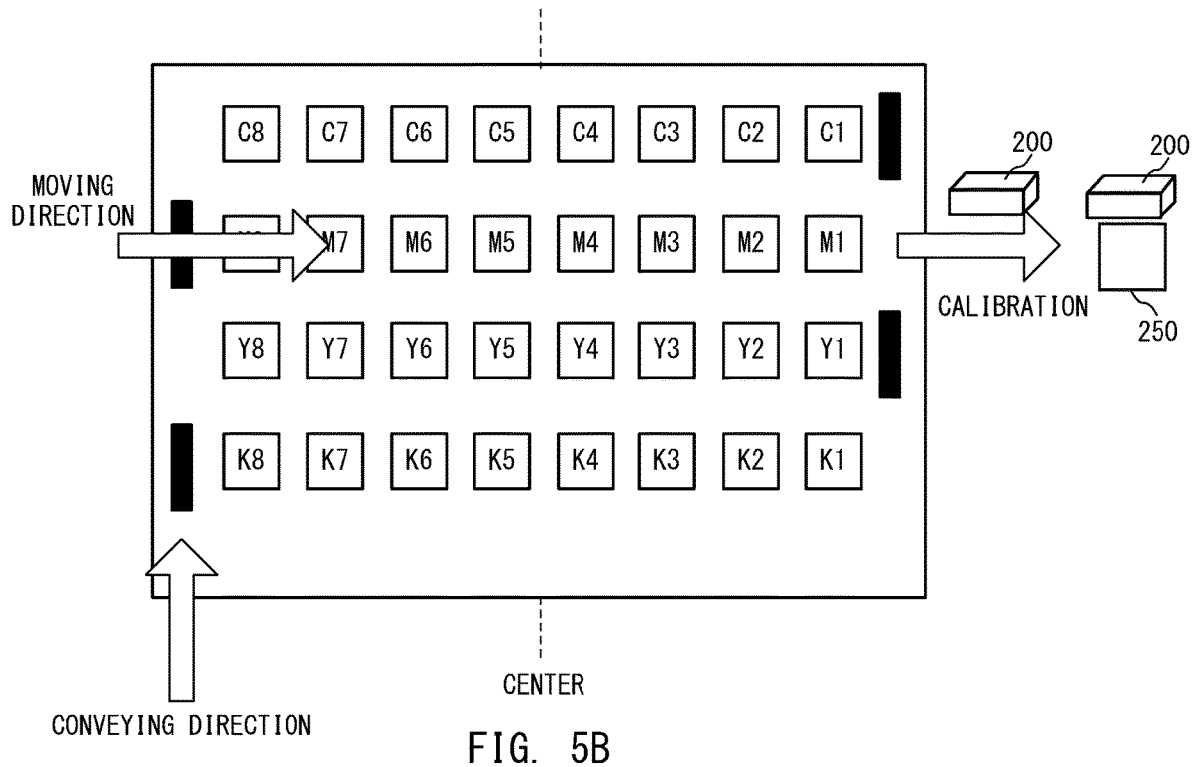

FIG. 5A and FIG. 5B are explanatory views of the density unevenness correction. As shown in FIG. 5A and FIG. 5B, the detection image used for the density unevenness correction consists of a plurality of patch images of the same color in the direction orthogonal to the conveying direction of the sheet 110. In the present embodiment, eight patch images of the same color are formed in the direction orthogonal to the conveying direction. Further, patch images of different colors are formed in the conveying direction. It means that the detection image which is formed on the sheet 110 includes a plurality of patch images formed vertically and horizontally in the conveying direction and in the direction orthogonal to the conveying direction. In the present embodiment, cyan patch images C1 to C8, magenta patch images M1 to M8, yellow patch images Y1 to Y8, and black patch images K1 to K8 are formed in order from a head side in the conveying direction. It should be noted that the direction orthogonal to the conveying direction of the sheet 110 is the main scanning direction of the photosensitive drum 105 by the laser scanner 107. The conveying direction of the sheet 110 is the sub-scanning direction of the photosensitive drum 105 by the laser scanner 107. The sub-scanning direction is a direction orthogonal to the main scanning direction.

The color detection sensor 200 detects the cyan patch images in order from the patch image C1 while moving in the direction orthogonal to the conveying direction (FIG. 5A). A trigger bar 600 is formed at a more forward position than a position where the color detection sensor 200 detects the patch image C1. After detecting the cyan patch images, the color detection sensor 200 detects the magenta patch images in order from the patch image M8 while moving in the direction orthogonal to the conveying direction (FIG. 5B). A trigger bar 601 is formed at an upstream side with respect to a position where the color detection sensor 200 detects the patch image M8. After detecting the magenta patch images, the color detection sensor 200 detects the yellow patch images in order from the patch image Y1 while moving in the direction orthogonal to the conveying direction. A trigger bar 602 is formed at an upstream side with respect to a position where the color detection sensor 200 detects the patch image Y1. After detecting the yellow patch images, the color detection sensor 200 detects the black patch images in order from the patch image K8 while moving in the direction orthogonal to the conveying direction. A trigger bar 603 is formed at an upstream side with respect to a position where the color detection sensor 200 detects the patch image K8. The white reference plate 250 is arranged to be detected by the color detection sensor 200 outside the patch images of the respective colors C1, M1, Y1, and K1.

The color detection sensor 200 detects the white reference plate 250 before detecting the cyan patch images C1 to C8 and the yellow patch images Y1 to Y8 but does not detect the white reference plate 250 before detecting the magenta patch images M1 to M8 and the black patch images K1 to K8. Thus, the color detection sensor 200 is calibrated before detecting the cyan patch images C1 to C8 and the yellow patch images Y1 to Y8. This is because the color detection sensor 200 detects the patch images of two colors (two rows) by a reciprocating movement. In a forward path, the color detection sensor 200 can detect the white reference plate 250 before detecting the patch images of a first color, and in a return path, the color detection sensor 200 cannot detect the white reference plate 250 before detecting the patch images of a second color.

Figure 6:
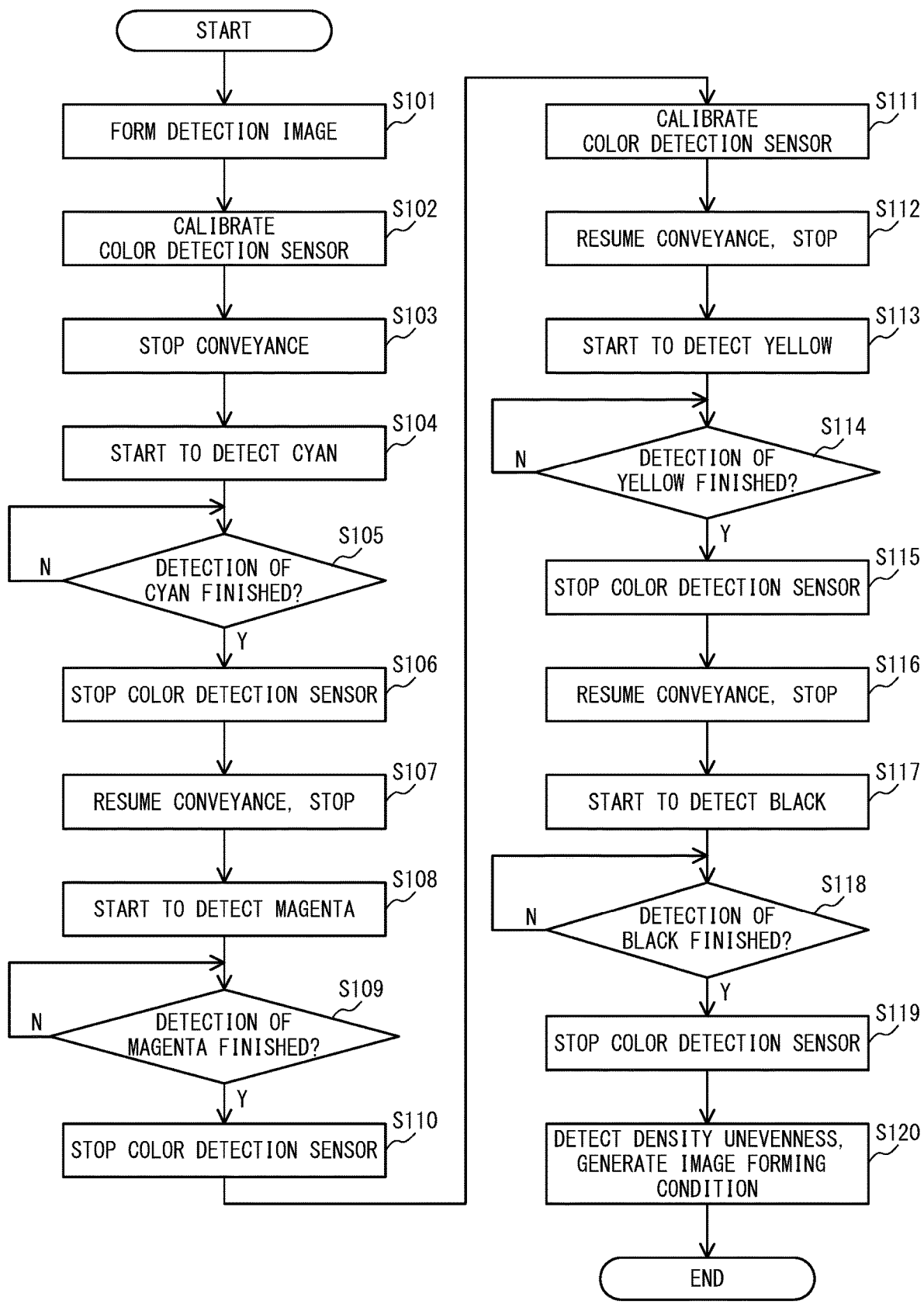
FIG. 6 is a flow chart showing density unevenness correction processing.

FIG. 6 is a flow chart showing density unevenness correction processing. The processing is performed when the screen illustrated in FIG. 3 is displayed on the operation panel 180 and the user selects the "density unevenness correction" button. The printer controller CPU 313 obtains an instruction from the operation panel 180 to perform the density unevenness correction, and instructs the density unevenness correction table generation part 306, the engine control CPU 102, and the color detection sensor 200 to perform the density unevenness correction.

In response to the instruction, the engine control CPU 102 forms the detection images illustrated in FIG. 5A and FIG. 5B on the sheet 110 by the image forming units 120, 121, 122, and 123, the transfer mechanism and the fixing device 150 (Step S101). The sheet 110 on which the detection image is formed is conveyed to the detection position of the color detection sensor 200 along the conveying path 135 by the conveying roller 139. The color detection sensor 200 detects the white reference plate 250 before detecting the detection image. The printer controller CPU 313 performs the calibration of the color detection sensor 200 including the light amount correction, spectral reflectance correction of the detection value and the like based on the detection result of the white reference plate 250 (Step S102).

When the calibration of the color detection sensor 200 is finished, the engine control CPU 102 conveys the sheet 110 on which the detection image is formed and stops the conveyance of the sheet 110 when the cyan patch images C1 to C8 reach the detection position of the color detection sensor 200 (Step S103). When the sheet 110 is stopped, the engine control CPU 102 detects the cyan patch images C1 to C8 while moving the color detection sensor 200 in an arrow direction orthogonal to the conveying direction of the sheet 110 shown in FIG. 5A (Step S104). The color detection sensor 200 starts the colorimetric analysis using the black trigger bar 600 as a reference. When the detection of the cyan patch images C1 to C8 is finished (Step S105: Y), the engine control CPU 102 stops the movement of the color detection sensor 200 (Step S106). Through the processing of the steps S103 to S106, the detection of the cyan patch images C1 to C8 is finished.

When the detection of the cyan patch images C1 to C8 is finished, the engine control CPU 102 conveys the sheet 110 on which the detection image is formed and stops the conveyance of the sheet 110 when the magenta patch images M1 to M8 reach the detection position of the color detection sensor 200 (Step S107). When the sheet 110 is stopped, the engine control CPU 102 moves the color detection sensor 200 in an arrow direction orthogonal to the conveying direction of the sheet 110 shown in FIG. 5B to detect the magenta patch images M8 to M1 (Step S108). The color detection sensor 200 starts the colorimetric analysis using the black trigger bar 601 as a reference. When the detection of the magenta patch images M8 to M1 is finished (Step S109: Y), the engine control CPU 102 stops the movement of the color detection sensor 200 (Step S110). Through the processing of the steps S107 to S110, the detection of the magenta patch images M8 to M1 is finished.

In the above processing, the calibration of the color detection sensor 200 is performed before performing the colorimetric analysis of the cyan patch images C1 to C8, but the calibration of the color detection sensor 200 is not performed before performing the colorimetric analysis of the magenta patch images M1 to M8. When the calibration of the color detection sensor 200 is performed after performing the colorimetric analysis of the cyan patch images C1 to C8, the white reference plate 250 needs to be detected after the color detection sensor 200 detects the cyan patch image C8. However, as a moving distance from the patch image C8 which is the eighth patch image to the white reference plate 250 is long, total time required for the calibration becomes long. Thereby, the calibration of the color detection sensor 200 is not performed before performing the colorimetric analysis of the magenta patch images M1 to M8. It means that the color detection sensor 200 detects the cyan patch images C1 to C8 and the magenta patch images M8 to M1 in one reciprocating movement, and the calibration of the color detection sensor 200 is performed before the reciprocating movement.

When the detection of the magenta patch images M8 to M1 is finished, the printer controller CPU 313 performs the calibration of the color detection sensor 200 based on the detection result of the white reference plate 250 by the color detection sensor 200 (Step S111). A position where the movement of the color detection sensor 200 stops in the processing of the step S110 is a position where it can detect the white reference plate 250. Accordingly, the color detection sensor 200 is promptly calibrated after the detection of the magenta patch images M8 to M1 is finished.

After the second calibration, the engine control CPU 102 causes the color detection sensor 200 to detect the yellow patch images Y1 to Y8 (Steps S112 to S115). This processing is the same as the detection processing of the cyan patch images C1 to C8 (Steps S103 to S106). After detecting the yellow patch images Y1 to Y8, the engine control CPU 102 causes the color detection sensor 200 to detect the black patch images K8 to K1 (Steps S116 to S119). This processing is the same as the detection processing of the magenta patch images M8 to M1 (Steps S107 to S110). As in the case of detecting the magenta patch images, the calibration of the color detection sensor 200 is not performed before detecting the black patch images K8 to K1 which is the return path.

The density unevenness correction table generation part 306 obtains the detection result of the patch images of the respective colors from the color detection sensor 200. The density unevenness correction table generation part 306 detects a color generating the density unevenness and a position where the density unevenness is generated from the obtained detection result and generates an image forming condition (density unevenness correction table) for correcting the detected density unevenness (Step S120). The density unevenness correction table generation part 306 stores the generated image forming condition (density unevenness correction table) in the table storage part 310 of the RAM 309. At the time of image formation, an image is formed using the image data corrected based on the image forming condition.

The present embodiment is intended to reduce the total time for the calibration of the color detection sensor 200. As the white reference plate 250 used for the calibration is read so as to minimize the moving distance of the color detection sensor 200 related to the calibration of the color detection sensor 200, the calibration time can be shortened.

Figure 7:
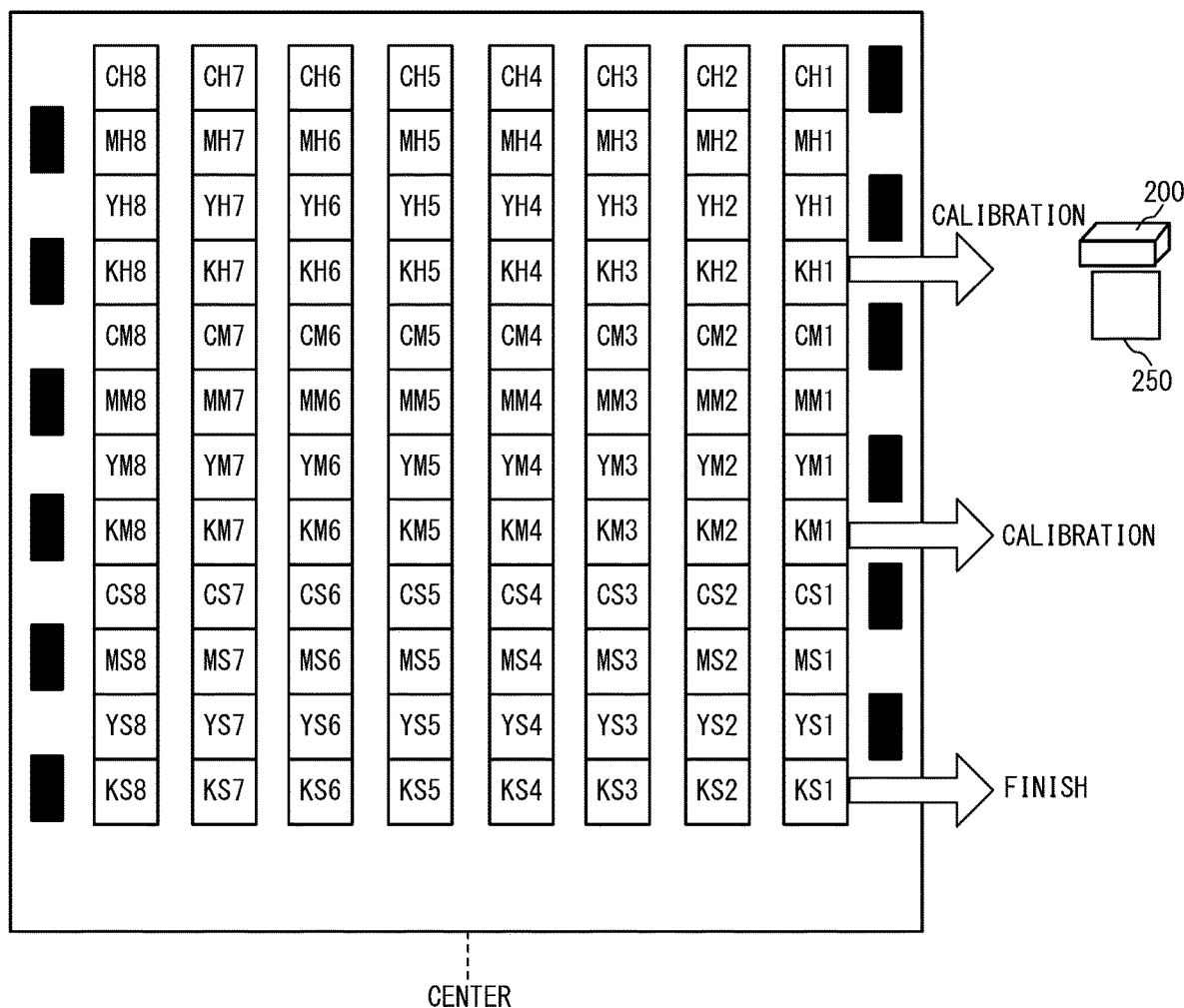
FIG. 7 is an explanatory view of density unevenness correction using a multi-gradation detection image.

The detection images shown in FIG. 5A and FIG. 5B consist of a plurality of patch images in which the patch images of the respective colors are single gradation patch images. Not limited to this, the detection image may consist of a plurality of patch images in which the patch images of the respective colors are multi-gradation patch images. FIG. 7 is an explanatory view of the density unevenness correction using the multi-gradation detection image. The detection image shown in FIG. 7 consists of a plurality of patch images in which the patch images of the respective colors are the multi-gradation patch images having low density (S), medium tone (M), and high density (H). In this case, similar to the case of FIG. 5A and FIG. 5B, the calibration of the color detection sensor 200 may be performed after detecting the patch images in the return path, though, in FIG. 7, the calibration of the color detection sensor 200 is performed after the color detection sensor 200 reciprocates predetermined number of times. Although depending on the characteristics of the color detection sensor 200 and an atmospheric temperature around the color detection sensor 200, if the accuracy of the color detection sensor 200 is allowable even though the calibration of the color detection sensor 200 is not performed for one reciprocation, it is possible to precisely correct the density unevenness even if the calibration is performed every other reciprocation. In FIG. 7, the calibration of the color detection sensor 200 is performed after detecting the patch image which is the closest to the white reference plate 250 starting from the patch image which is farthest from the white reference plate 250. The calibration happens every other time.

Stabilization Control

Figure 8A:
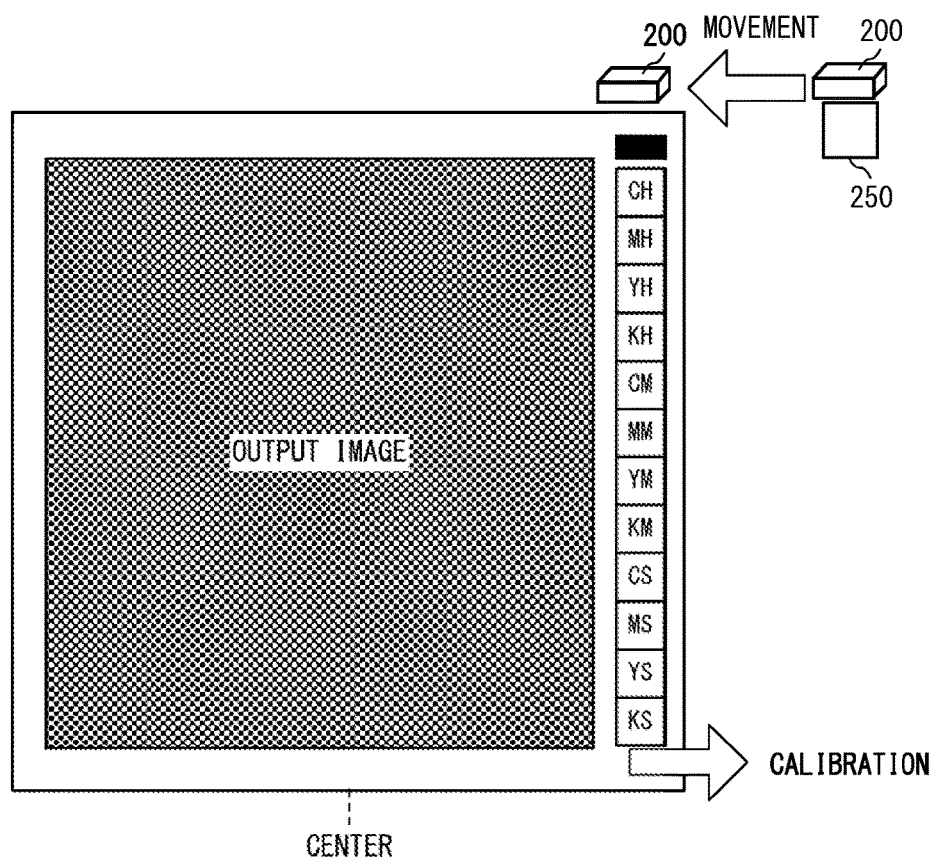

FIG. 8A and FIG. 8B are explanatory views of the stabilization control. The stabilization control is performed when consecutively forming images (output images) in response to an input of a print job by the user. FIG. 8A describes the stabilization control of the present embodiment. FIG. 8B describes conventional stabilization control. Thus, the detection images are formed outside of an image area in which the output image is formed. The detection image for the stabilization control of the present embodiment is formed in a margin of the white reference plate 250 side rather than that of the output image. The detection image for the conventional stabilization control is formed farther away from the color detection sensor 200 than the output image. In the stabilization control of the present embodiment, twelve patch images are formed on the sheet 110. The twelve patch images are arranged in a column in the conveying direction of the sheet 110. It should be noted that the number of the patch images is not limited to twelve. The number of the patch images may be determined as appropriate.

Figure 9:
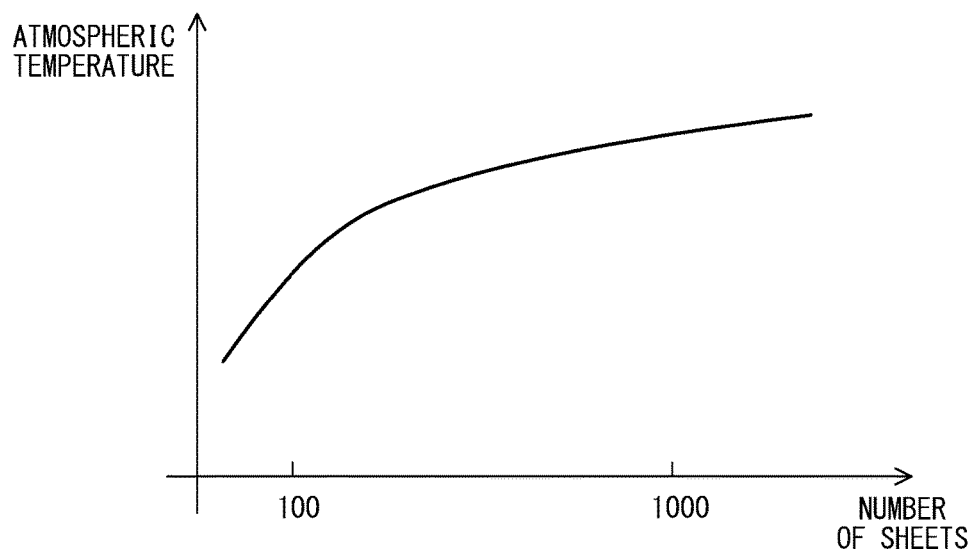
FIG. 9 is a graph showing relation between the number of sheets on which images are consecutively formed and an atmospheric temperature.

When consecutively forming images, a temperature of the conveying path 135 rises due to the sheet 110 heated by the fixing processing. The temperature rise of the conveying path 135 leads to a rise in the atmospheric temperature around the color detection sensor 200. FIG. 9 is a graph showing relation between the number of sheets on which images are consecutively formed and the atmospheric temperature. The color detection sensor 200 is calibrated using the white reference plate 250, but if the atmospheric temperature rapidly rises, performing highly accurate calibration becomes difficult. This is because the rapid temperature rise causes a change in the light emitting characteristics of the white LED 201, a change in sensitivity of the line sensor 203, a change in a temperature of a holding member of the color detection sensor 200 and the like. Thus, in an environment in which the rapid temperature rise occurs, it is better to highly frequently perform the calibration of the color detection sensor 200. To highly frequently perform the calibration of the color detection sensor 200, it is necessary to highly frequently detect the white reference plate 250. In the case shown in FIG. 8A, the color detection sensor 200 detects the white reference plate 250 twelve times while the sheet 110 passes through the detection position.

The color detection sensor 200 is calibrated by reading the white reference plate 250 before detecting the detection image. Thereafter, the color detection sensor 200 sequentially detects the patch images of the respective colors CH to KS as the detection images from the sheet 110 which is conveyed in the conveying direction. The patch images CH to KS are formed in a line in the conveying direction of the sheet 110. When the detection of all patch images is finished, the color detection sensor 200 is calibrated by reading the white reference plate 250. The printer controller 300 performs the stabilization control based on the detection result of the detection image by the color detection sensor 200.

The detection image of the present embodiment shown in FIG. 8A is formed at a position closer to the white reference plate 250 by the output image than the conventional detection image shown in FIG. 8B. Thus, the moving distance for the color detection sensor 200 to detect the white reference plate 250 is shortened compared to the conventional one. Due to this, the time required for the calibration is shortened and the number of times to detect the detection image can be increased compared to the conventional one, and the calibration can be performed following the environmental change of the LBP 100.

As described above, by forming the detection image on the white reference plate 250 side of the sheet 110, the stabilization control during the consecutive image formation makes it possible to highly frequently perform the calibration of the color detection sensor 200 without reducing the number of times of performing the calibration.

Automatic Color Tone Correction

Figure 10:
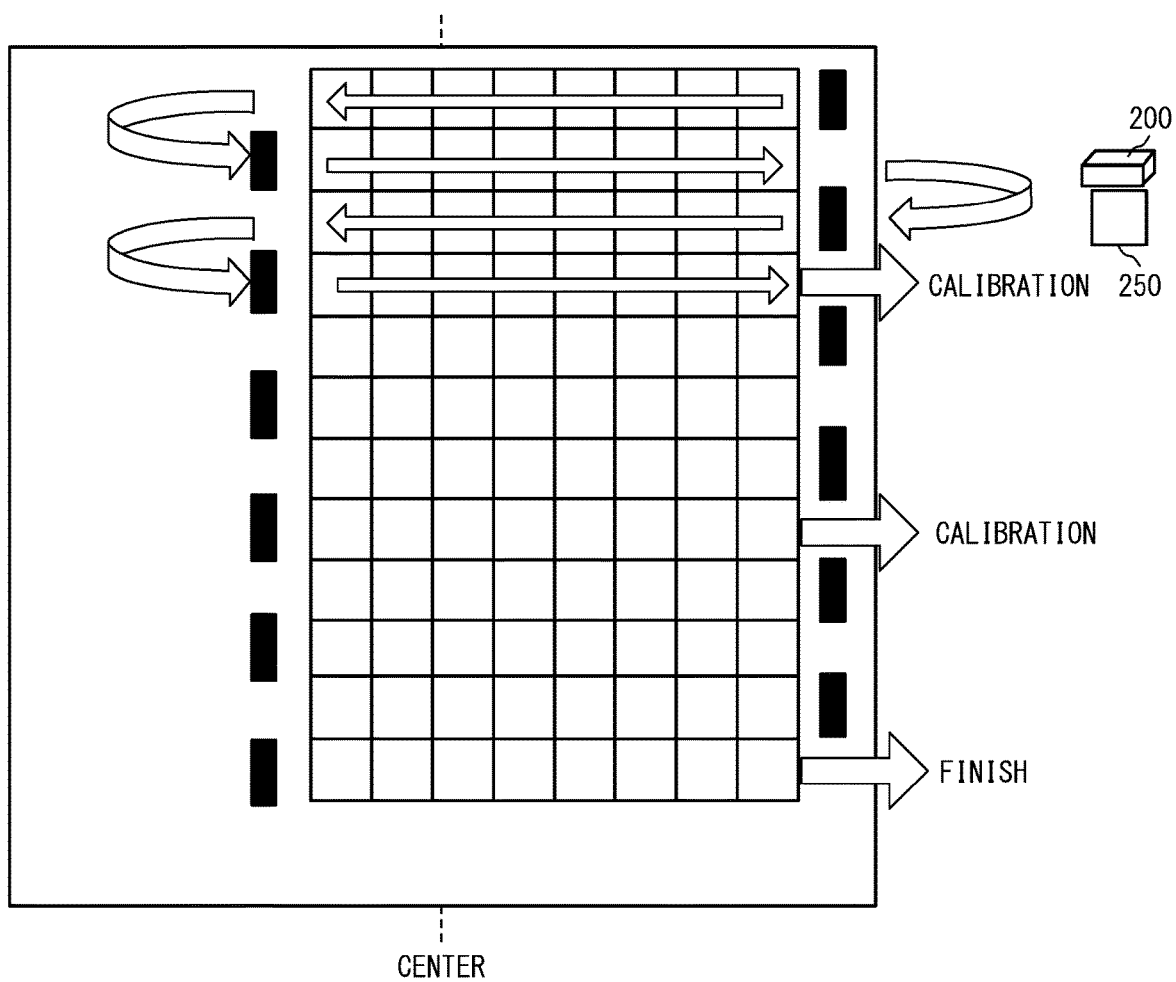
FIG. 10 is a diagram explaining automatic color tone correction.

FIG. 10 is an explanatory view of an automatic color tone correction. In FIG. 10, the detection image consisting of a plurality of patch images is formed, closer to the white reference plate 250 side with respect to a center, vertically and horizontally in the direction orthogonal to the conveying direction of the sheet 110. In the stabilization control of the present embodiment, ninety-six patch images are formed on the sheet 110. Twelve patch images arranged in the conveying direction of the sheet 110 are arranged in eight columns in the conveying direction.

As described above, in the automatic color tone correction, the ICC profile is prepared. To prepare the ICC profile, it is necessary to grasp the color reproduction range of the LBP 100. To this end, in general, it is necessary to perform L*a*b colorimetric analysis using a large amount of patch images (923 patches, 1617 patches). Because of that, the automatic color tone correction takes a long time to detect the detection image. This results in a change in detection characteristics of the color detection sensor 200 due to a self temperature rise of the white LED 201 of the color detection sensor 200. To cope with the change in the detection characteristics, the color detection sensor 200 is calibrated using the white reference plate 250 at a frequency of once after detecting predetermined number of patch images, for example, at a frequency of once after detecting fifty patch images. In FIG. 10, after detecting the patch image in the return path, the calibration is performed.

In the case of the automatic color tone correction, similar to the cases of the density unevenness correction and the stabilization control, to shorten the total time required for the calibration of the color detection sensor 200, the calibration is performed when the color detection sensor approaches the white reference plate 250. Similar to the case of the stabilization control, the detection image (patch images) is formed on the sheet 110 in such a manner that the detection image is positioned on the white reference plate 250 side when the sheet 110 reaches the detection position of the color detection sensor 200. The color detection sensor 200 detects the detection image while reciprocating in the direction orthogonal to the conveying direction of the sheet 110, and the calibration is performed only when the color detection sensor 200 reaches a position capable of detecting the white reference plate 250. As a result, the total time required for the calibration is shortened. In the case shown in FIG. 10, the color detection sensor 200 detects the white reference plate 250 six times while the sheet 110 passes through the detection position.

The multi-order color table generation part 308 prepares the ICC profile from relation between the detection result (colorimetric analysis value) and the spectral reflectance information of the color detection sensor 200, and suppresses the change in multi-order color which cannot be corrected by a single color.

The LBP 100 as the image forming apparatus of the present embodiment includes the color detection sensor 200 which is the spectral sensor capable of moving in the direction orthogonal to the conveying direction of the sheet 110, and is provided with the white reference plate 250 used for the calibration of the color detection sensor 200 at a position away from the conveying path of the sheet 110. To highly frequently perform the calibration of the color detection sensor 200, the LBP 100 forms the detection image for correcting the image forming condition on the white reference plate 250 side (reference plate side) of the sheet 110. This enables the color detection sensor 200 to shorten the moving distance when performing the calibration, which shortens the total time required for the calibration.

Further, by reducing the number of times that the white reference plate 250 is detected when detecting the detection image during the consecutive image formation as compared to the number of times that the white reference plate 250 is detected when detecting the detection image except during the consecutive image formation, it is possible to realize shortening of the detection time. Due to this, the time spent for detecting the detection image on the sheet 110 by the sensor (color detection sensor 200) is suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-194217, filed Oct. 15, 2018, which is hereby incorporated by reference herein in its entirety.

What is claimed is:

1. An image forming apparatus comprising:
   an image forming unit configured to form an image on a sheet based on an image forming condition;
   a conveying unit configured to convey the sheet;
   a sensor configured to move in a direction orthogonal to a conveying direction in which the conveying unit conveys the sheet, and detect a detection image on the sheet;
   a reference member provided at a position different from a passage area of the sheet in the direction orthogonal to the conveying direction; and
   a controller configured to:
      control the image forming unit to form first detection images outside of an image area on the sheet, wherein the image forming unit forms an output image on the image area;
      control the image forming unit to form second detection images on the sheet without forming the output image;
      perform a first mode in which the sensor detects the first detection images and the reference member;
      perform a second mode in which the sensor detects the second detection images and the reference member;
      calibrate the sensor based on a detection result of the reference member;
      generate the image forming condition based on a detection result of the first detection images; and
      generate the image forming condition based on a detection result of the second detection images,
   wherein the number of times that the sensor detects the reference member in the first mode is greater than the number of times that the sensor detects the reference member in the second mode,
   wherein the first detection images include at least twelve detection images arranged along the conveying direction, and
   wherein the second detection images include at least twelve detection images arranged along the conveying direction.

2. The image forming apparatus according to claim 1, wherein the first detection images are formed in a margin of the first sheet.

3. The image forming apparatus according to claim 1, wherein the controller is further configured to generate a first image forming condition based on a detection result of the first detection images, and
   wherein the controller is further configured to generate a second image forming condition which is different from the first image forming condition based on a detection result of the second detection images.

4. The image forming apparatus according to claim 1, wherein the image forming condition includes a correction condition for correcting density unevenness of the image formed by the image forming unit.

5. The image forming apparatus according to claim 1, further comprising an image processing unit configured to perform image processing on image data,
   wherein the image forming unit is further configured to form the image based on the image data by which the image processing unit performs the image processing, and
   wherein the image forming condition includes an image processing condition used for the image processing.

6. The image forming apparatus according to claim 1, wherein the image forming condition includes a maximum density condition for adjusting maximum density of an image formed by the image forming unit.

7. The image forming apparatus according to claim 1, wherein the image forming condition includes a lookup table for adjusting gradation characteristics of an image formed by the image forming unit.

8. The image forming apparatus according to claim 1, wherein the controller is further configured to control the conveying unit to stop the sheet in a case in which each of a plurality of detection images formed at different positions on the sheet in the conveying direction is detected by the sensor.

9. The image forming apparatus according to claim 1, wherein the number of the first detection images is less than the number of the second detection images.

* * * * *